(12) United States Patent
Sugawara

(10) Patent No.: US 6,388,804 B1
(45) Date of Patent: May 14, 2002

(54) OPTICAL AMPLIFIER

(75) Inventor: Toshiki Sugawara, Koganei (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/808,944

(22) Filed: Mar. 16, 2001

(30) Foreign Application Priority Data

Aug. 21, 2000 (JP) .......................................... 12-254259

(51) Int. Cl.$^7$ ................................................ H01S 3/00
(52) U.S. Cl. ................ 359/337.11; 359/341.4
(58) Field of Search .................. 359/337.1, 337.11, 359/341.4

(56) References Cited

U.S. PATENT DOCUMENTS

| | | | | |
|---|---|---|---|---|
| 5,909,305 A | * | 6/1999 | Kinoshita | .................... 359/341 |
| 6,061,171 A | * | 5/2000 | Taylor et al. | ................ 359/341 |
| 6,246,511 B1 | * | 6/2001 | Jameson | ..................... 359/337 |

FOREIGN PATENT DOCUMENTS

| | | |
|---|---|---|
| JP | 4-11794 | 1/1992 |
| JP | 10-335722 | 12/1998 |

* cited by examiner

*Primary Examiner*—Mark Hellner
(74) *Attorney, Agent, or Firm*—Mattingly, Stanger & Malur, P.C.

(57) ABSTRACT

Disclosed is an optical amplifier which is smaller in power consumption and number of component parts, simpler in structure, and rid of wavelength dependency of gain against the variation of input light power and temperature. The optical amplifier has a characteristic information table which stores data of a proper curve indicative of the relation between the pumping light power and output light power of the optical amplifying medium at a constant gain tilt of wavelength-multiplexed signal light, and a pumping light controller which controls the pumping power such that the output light power and pumping light power of the optical amplifying medium are related to lie on the proper curve.

18 Claims, 12 Drawing Sheets

SITUATION OF CONSTANT GAINT TILT

SITUATION OF CONSTANT GAIN

FORWARD PUMP

BACKWARD PUMP

BIDIRECTIONAL PUMP

OPTICAL AMPLIFIER

BACKGROUND OF THE INVENTION

The present invention relates to an optical amplifier, and particularly to an optical amplifier used suitably for systems which adopt the optical transmission system based on wavelength division multiplex.

Recently, optical transmission systems which use optical amplifiers as repeaters are studied and put into practice vigorously. It is particularly beneficial for the multi-media service industry typified by the Internet to increase the communication capacity based on the WDM (Wavelength Division Multiplex) system for multiplexing individual signal lights of different wavelengths. In the optical communication system using the WDM technique, the optical repeating amplifier which amplifies all individual signal lights at once has an extremely crucial role for the extension of transmission distance.

For the optical amplifying medium which forms the optical amplifier, optical fiber, with rare earth being added thereto, is useful, and it is under study and about to be put into practice. Particularly, erbium-doped fiber (hereinafter, abbreviated as "EDF"), which is active for amplification in a wide range of wavelength in which the loss of optical fiber is small, is used extensively in optical fiber communication systems.

In order for the optical amplifying medium to be active for amplification in the band of signal light wavelengths, a pumping light which is shorter in wavelength than the signal light is inputted together with the signal light into the medium. The optical amplifying medium has at its end the connection of a WDM optical coupler so that the signal light and pumping light are incident efficiently to the medium.

However, the rare-earth-added optical fiber is narrow in its gain flatness region against signal wavelengths in amplifying the WDM signal light at once, and even with the imposition of limitation of the wavelength range, the gain flatness against signal wavelengths is deteriorated by the variation of input signal light power.

As a scheme of overcoming this problem, there is known a technique for suppressing the wavelength dependency of the gain at different input light power levels, in which the input power and output power of the optical amplifying medium are measured and the pumping light power is adjusted based on automatic gain control (AGC) so that the average gain evaluated from the measured power levels is constant. The optical amplifier based on this scheme further adopts constant output control by use of a variable optical attenuator.

However, the actual optical amplifier has its gain characteristics varied by the temperature variation in addition to the variation of input light power. Therefore, an optical amplifier, which is designed to have a minimal gain's wavelength dependency at a certain temperature, cannot be rid of the wavelength dependency based solely on the AGC due to the variation of operating temperature.

With the intention of overcoming this problem, there is known a technique of flattening the gain of optical amplifier throughout the wavelengths. For example, a technique disclosed in Japanese Patent Laid-open (Kokai) No. Hei 4-11794 implements constant temperature control for the optical amplifying medium by using a temperature control device such as a Peltier device, and the optical amplifier has a flat gain throughout the wavelengths. Another technique disclosed in Japanese Patent Laid-open (Kokai) No. Hei 10-335722 is designed to control the characteristics of the optical filter device in response to the temperature measured with a thermistor, thereby offsetting the gain's wavelength dependency.

SUMMARY OF THE INVENTION

However, the above-mentioned conventional techniques involve the following problems. A system which uses a temperature control device such as a Peltier device has inevitably an increased power consumption, and the system will be complex and bulky due to the need of heat dissipation of the Peltier device. A system which offsets the gain's wavelength dependency by using a thermistor and optical filter device encounters the difficulty in the availability of an optical filter device capable of rectifying sufficiently the gain's wavelength dependency of EDF attributable to the variation of input light power and temperature. Moreover, this system having the additional control parameter of temperature will inevitably have an increased component parts and intricate control operation.

A primary object of the present invention is to overcome the foregoing prior art deficiencies, and specifically provide an optical amplifier which is smaller in power consumption and number of component parts, simpler in structure, and rid of the gain's wavelength dependency against the variation of input light power and temperature.

A second object of the present invention is to provide an optical amplifier which has a flatter gain (smaller in dependency of gain on the input signal power, temperature of optical amplifier and input signal wavelengths).

A third object of the present invention is to offer a structure of optical amplifier which is smaller in power consumption than conventional counterparts.

A fourth object of the present invention is to provide an optical amplifier which has a smaller number of component parts as compared with conventional counterparts.

The inventors of the present invention have conducted experiments on rare-earth-added fiber as a kind of optical amplifier, and found the following facts. (1) The output light power vs. pumping light power proper curve, with the input light power and temperature being varied and with the gain's wavelength dependency being retained virtually constant, i.e., the gain tilt is virtually constant throughout the wavelengths, is a virtually simple increase function or a virtually linear function. (2) If the output light power and pumping light power are related to lie on the above-mentioned proper curve, gain characteristics with a virtually invariable gain's wavelength dependency against the variation of input light power and temperature can be obtained.

Accordingly, based on the use of a proper curve without or with practically a sufficiently small gain tilt and on the retention of the output light power and pumping light power on the proper curve, it is possible to accomplish an optical amplifier which operates virtually on the proper curve without or with practically a sufficiently small gain tilt, as will be explained in detail later.

In case the input WDM signal has a gain tilt, a proper curve of the opposite tilt for the input WDM signal is used so that the output light power and pumping light power are related to lie on the proper curve, and the EDF optical amplifier can produce an output light without a gain tilt.

The present invention is based on the foregoing findings, and the above-mentioned objectives are attained by the provision of a characteristic information table which contains data of the output light power vs. pumping light power proper curve of the optical amplifying medium at a virtually constant gain tilt of WDM signal light, and the provision of a pumping light controller which controls the pumping light power so that the output light power and pumping light power of the optical amplifying medium are related to lie virtually on the given proper curve. Adopting this scheme retains the relation of the output light power and pumping light power virtually on the proper curve, and attains gain characteristics without wavelength dependency or with practically a sufficiently small gain tilt against the variation of input light power and ambient temperature.

The pumping light controller is arranged, for example, as follows. The proper curve is obtained in advance. The relation between the pumping power and output power on condition that the gain tilt is virtually minimum, i.e., the variation of output power in response to the increase of pumping power, can be evaluated based on the experiment. The output power vs. pumping power relation in terms of an approximate curve provides the proper curve. Light detecting means are used to detect the pumping light power value and the output light power value.

A means which inputs both detected light power values, takes out a pumping power value based on the proper curve in response to the input of the detected output light power value, and makes the detected pumping light power value the taken out pumping light power value is part or whole of constituent parts of the pumping light controller. The controller can be formed of an operational amplifier having its two input terminals. The detected pumping light power value is inputted to one of the input terminals and the taken out pumping light power value is inputted to the other input terminal so that a light source of pumping light is controlled with the output signal of the operational amplifier.

Specifically, a first optical amplifier based on this invention comprises an optical amplifying medium which amplifies an input light by receiving a pumping light, a light source which generates the pumping light, and a pumping light controller which controls the pumping light power. The pumping light controller includes a characteristic information table which contains data of the relation between the output light power and pumping light power of the optical amplifying medium at a virtually constant gain tilt among wavelengths of the input light, and a light source controller which controls the light source by using the pumping light power value which is read out of the table in response to the output light power level resulting from the amplification of the optical amplifying medium so that the pumping light power reaches the readout pumping light power.

The input light can possibly have its power level varied inherently even if it does not have wavelength dependency. An effective scheme to deal with this matter is the provision of a variable optical attenuator for the optical amplifier, with the degree of attenuation being controlled so that the output light power is virtually constant.

A second optical amplifier based on this invention, which is derived from the first optical amplifier and intended to have a constant output light power, further includes a variable optical attenuator which attenuates the output light of the optical amplifying medium, and an attenuation controller which controls the degree of attenuation of the attenuator by using the measurement result of output light power of the attenuator so that the attenuator output light power has a certain level.

A third optical amplifier based on this invention, which is derived from the first optical amplifier and intended to have a virtually constant output light power, further includes a variable optical attenuator which attenuates the output light of the optical amplifying medium, and an attenuation controller which controls the degree of attenuation of the attenuator by using the measurement result of output light power of the optical amplifying medium so that the optical attenuator has an output light of a certain power level.

The second and third optical amplifiers need to have their output light powers stepped up initially by the quantity of attenuation by the optical attenuator. In case the optical amplifier drives an optical fiber cable, a large output light power which is accompanied by a large power consumption is required, and the above-mentioned stepped-up output light power preparatory to attenuation can be a matter of power capacity. An effective scheme to deal with this matter is to form the optical amplifier in two-stage amplifiers, with the attenuator being placed between these amplifiers. The attenuation of output power is not significant to the former amplifier.

A fourth optical amplifier based on this invention, which is derived from the above-mentioned two-stage where the optical amplifier is defined as a optical amplifying unit, includes two optical amplifying units connected by being interposed by a variable optical attenuator, and an attenuation controller which is connected to the output of the latter optical amplifying unit and adapted to control the degree of attenuation of the output light of the latter optical amplifying unit by using the measurement result of the output light power of the latter optical amplifying unit so that the latter optical amplifying unit has an output light of a predetermined power level.

The fourth optical amplifier has a predetermined output light power, which allows to determine the pumping light power of the latter optical amplifying unit fixedly.

A fifth optical amplifier based on this invention is intended to make the pumping light power value read out of the table of the latter optical amplifying unit correspondent to a predetermined output power, thereby fixing the pumping light power of the latter optical amplifying unit.

In case the input light has a relatively large power level, the former optical amplifying unit can be eliminated.

A sixth optical amplifier based on this invention is made up of the latter optical amplifying unit solely and the optical attenuator of the fifth optical amplifier.

Optical transmission systems are required to have high amplification factors in some cases (e.g., a system having a long segment of fiber cable between repeaters). An effective scheme to deal with this case is the installation of multistage optical amplifying units.

A seventh optical amplifier based on this invention is derived from the fourth optical amplifier, with its latter stage being made up of amplifying units of n in number, thereby raising the amplification factor.

The seventh optical amplifier has a predetermined power level of the latter-stage output light, allowing the pumping light power of each of latter optical amplifying units to be determined fixedly.

An eighth optical amplifier based on this invention is derived from the seventh optical amplifier, with its latter stage made up of optical amplifying mediums of n in number which are connected in series and each of which amplifies an input light by inputting a pumping light, light sources of n in number which generate pumping lights to be fed to the n optical amplifying mediums, and a pumping light controller which controls the n pumping lights to have power levels which are expressed in terms of predetermined constants $\alpha_1$, $\alpha_2, \ldots, \alpha_n$ and a reference pumping power $P_p$ to be $\alpha_1 P_p$, $\alpha_2 P_p, \ldots, \alpha_n P_p$. The pumping light controller includes a characteristic information table which contains data of the output power levels vs. reference pumping power level $P_p$ characteristics of the last-stage optical amplifying mediums at a constant gain tilt throughout the input light wavelengths, and a light source controller which controls the n light sources by using the reference pumping power value $P_p$ which is read out of the table in response to a predetermined output power value so that the n light sources have pumping light power levels which are equal to the reference pumping light power $P_p$ multiplied by the above-mentioned constants.

The foregoing inventive optical amplifiers are advantageous in that the gain's wavelength dependency against the variation of input power and temperature can be made smaller, the characteristic information table can be formed of a semiconductor IC ROM (Read Only Memory) for example, and the controller can be formed of a semiconductor IC processor, whereby these optical amplifiers can be smaller in power consumption and number of component parts and simpler in structure.

DESCRIPTION OF THE PREFERRED EMBODIMENTS

Optical amplifiers based on the embodiments of this invention will be explained in detail with reference to the drawings.

Same or like parts are referred to by the common symbols in FIG. 3, FIGS. 4(a), 4(b) and 4(c), and FIG. 7 through FIG. 13.

Figure 1A:
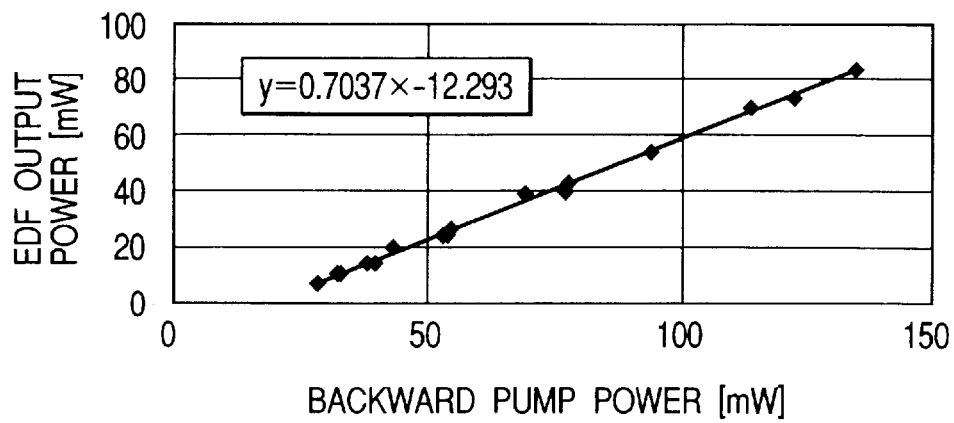
FIGS. 1(a) and 1(b) are characteristic graphs of rare-earth-added fiber, explaining the inventive optical amplifier.

The property of rare-earth-added fiber revealed by the present invention will be explained in connection with FIGS. 1(a) and FIG. 1(b). FIG. 1(a) is a graph on which the output light power (EDF output power) is plotted on the vertical axis against the pumping light power (backward pumping power) on the horizontal axis based on experimental data collected for various input light power levels and temperatures on condition that the gain tilt is minimum or virtually minimum. The gain tilt is defined here to be the difference between the maximum individual signal light gain and the minimum individual signal light gain among different gain values resulting from different wavelengths of the amplified WDM signal light.

Rare-earth-added fiber used in the experiment was EDF (erbium-doped fiber). The EDF had an erbium concentration of 400 ppm, and had an additional substance of $Al_2O_3$ at a concentration of 11000 ppm. The EDF had a length of 300 m. The EDF was connected on both sides through WDM couplers with semiconductor laser diodes for pumping so that it is pumped in two directions. A 4-channel (ch) input WDM signal light formed of four individual signal lights having wavelengths of 1570, 1579, 1589 and 1599 nm was used.

The power of the input signal light was set to −28, −25 and −22 dBm/ch sequentially, and the pumping laser power was adjusted so that the values of the amplified individual signal light outputs are equal among the wavelengths, while monitoring the spectrum constantly with a spectral analyzer.

Figure 2A:
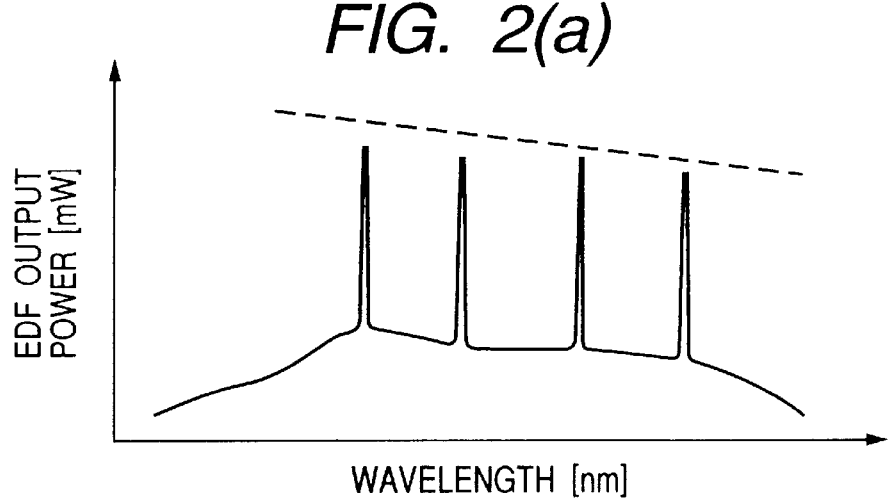
FIGS. 2(a), 2(b) and 2(c) are graphs used to explain the wavelength dependency of the pumping light power vs. output light power relation of the inventive optical amplifier.
Figure 2B:
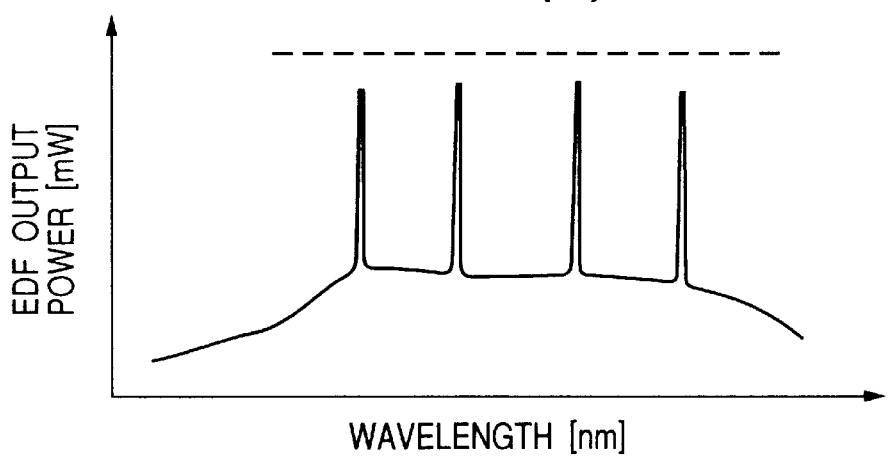
Figure 2C:
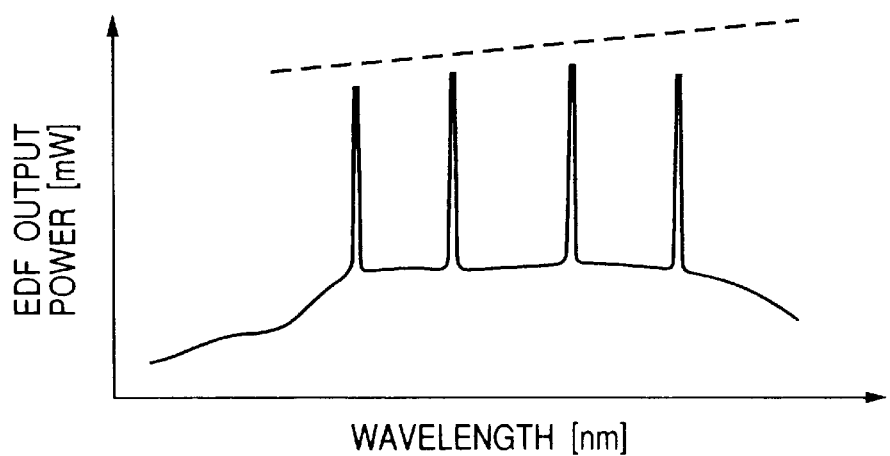

As the pumping light power was increased, the output spectrum of EDF varied gradually from a state of ascent with the wavelength as shown in FIG. 2(c) to a state of descent with the wavelength as shown in FIG. 2(a). In adjusting the pumping light power, this nature of spectrum variation was used to find the state of minimum gain tilt. The adjustment of pumping light power was only for the backward pumping laser, with the forward pumping laser power being fixed to 167 mW. The temperature of EDF which was placed in a thermal chamber was set to 0, 25, 50 and 70° C. sequentially during the measurement.

FIG. 1(a) shows the result of experiment. The graph exhibits the relation between the output light power and pumping light power measured at the minimum gain tilt (refer to FIG. 2(b)) while varying the input light power and temperature. These specific light power levels were found to be plotted virtually on a straight line as shown in FIG. 1(a). The line was formulated based on the least square method in terms of x for the pumping light power and y for the output light power, and found to be a linear function of $y = 0.7037x - 12.293$.

The output light power vs. pumping light power relation can occasionally be on a curve with bends depending on the influence of the amplified spontaneous emission, the characteristics of the output light power detector, etc. This bending curve is assumed to be a simple curve which represents an ascending function.

A Proper curve for a certain gain tilt can be obtained by moving up or down the proper curve of the minimum gain tilt shown in FIG. 1(a). Accordingly, in case the input signal light has an inherent gain tilt, it can be rectified based on a derivative output light power vs. pumping light power function which is conditioned to have a gain tilt opposite to that of the input signal light, and in consequence the optical amplifier can produce an output light having a virtually minimum gain tilt.

Figure 1B:
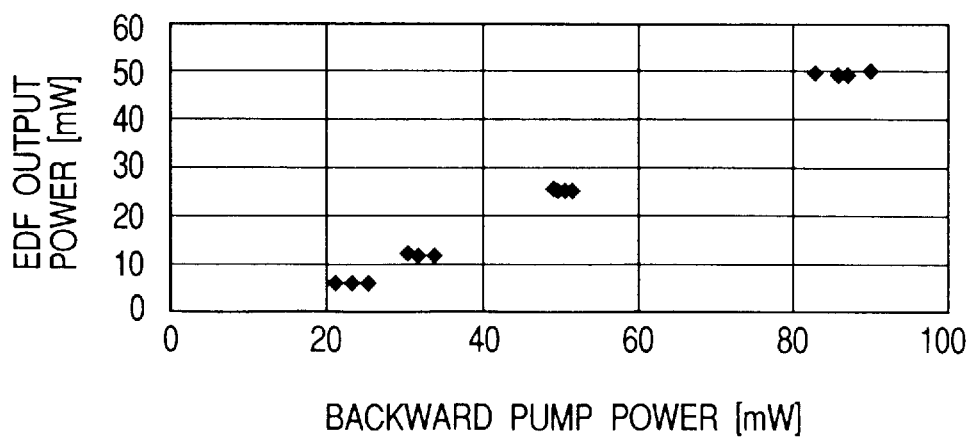

FIG. 1(b) shows, for the reference purpose, the output light power vs. pumping light power relation based on constant gain control, instead of the condition of minimum gain tilt. The plots were obtained by the measurement using a 4-channel WDM input signal of the same wavelengths as the case of FIG. 1(a) at power levels of −28, −25, −22 and −19 dB/ch and at temperatures 0, 25, 50 and 70° C. The input light power and EDF output light power were measured for individual channels while adjusting the pumping light power so that the gain is constant at 30 dB. In this case of constant gain control, the pumping light power necessary to keep a constant gain varies slightly depending on the temperature, and therefore the plots lie on the steps of input power.

The embodiments of this invention are designed to achieve the state of a virtually minimum and constant gain tilt even in the presence of the variation of input light power and temperature based on the use of the characteristics shown in FIG. 1(a).

Figure 3:
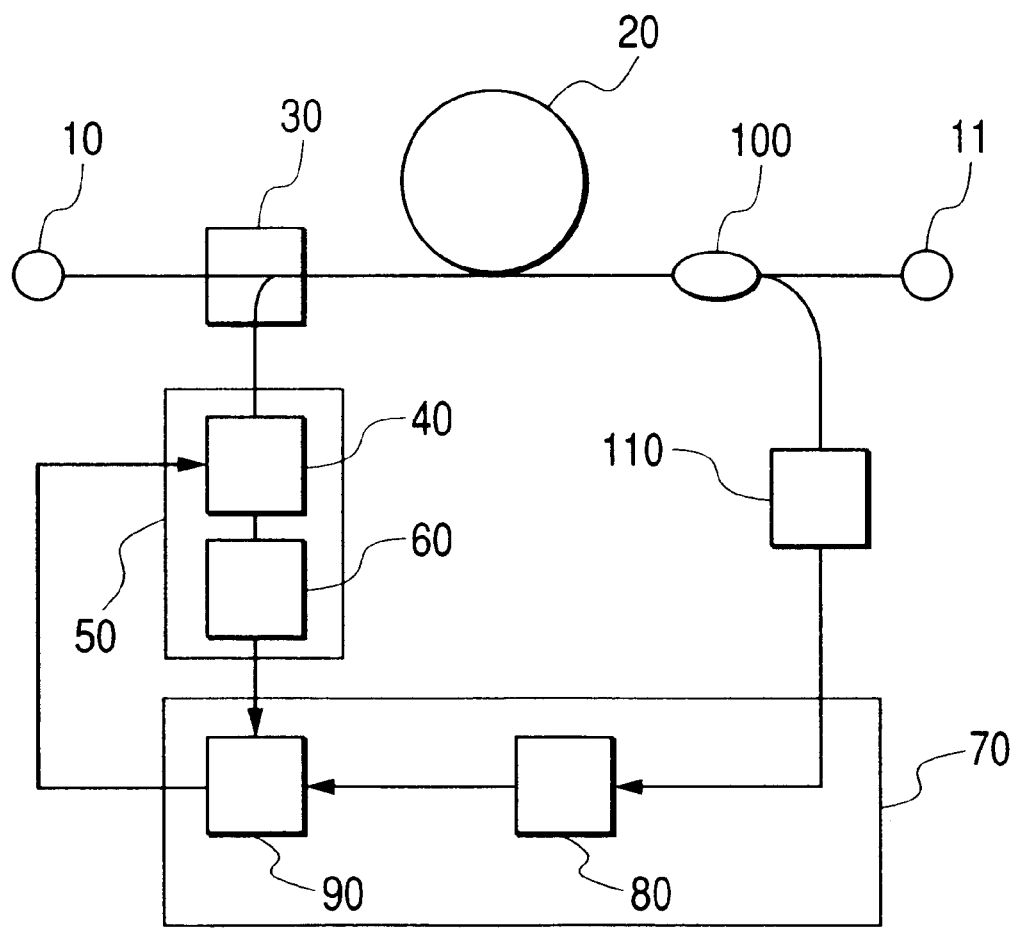
FIG. 3 is a block diagram of the optical amplifier based on a first embodiment of this invention.

FIG. 3 shows the optical amplifier based on the first embodiment of this invention. It is made up of a WDM optical coupler 30 which adds a pumping light to a WDM signal light which is received by an input port 10 from the outside, a rare-earth-added fiber 20 which amplifies the WDM signal light from the coupler 30, a pumping unit 50 which includes a pumping laser diode 40 as a pumping light source and an optical detector 60 for detecting the pumping light power, a tap coupler 100 which takes out part of the output light of the rare-earth-added fiber 20 while transmitting the majority thereof to an output port 11, another optical detector 110 which detects the output light power of the rare-earth-added fiber 20, and a pumping light controller 70 which controls the pumping light power of the pumping laser diode 40 based on the measurement results of the optical detectors 60 and 110.

The pumping laser diode 40, in many cases, incorporates a Fabry-Perot resonator, which emits from one end a laser beam to be fed as the pumping light to the coupler 30 and emits from another end a laser beam to be fed to the optical detector 60. Thus, the optical detector 60 which inputs the part of the laser power of the pumping laser diode 40 outputs a current, which is proportional to the laser power and indicative of the monitored quantity (detected result) of the pumping light power. The monitored quantity of the pumping light power is fed to the pumping light controller 70. Similarly, the optical detector 110 which inputs the part of the output light from the tap coupler 100 outputs a current, which is proportional to the output light power and indicative of the monitored quantity of the output light power transmitted to the output port 11. The monitored quantity of the output light power is fed to the pumping light controller 70.

The pumping light controller 70 is made up of a characteristic information table 80 and a control processor 90 which produces a drive signal to the pumping laser diode 40. The characteristic information table 80 contains the above-mentioned linear function resulting from the measurement of the output light power vs. pumping light power relation of the rare-earth-added fiber 20 at the minimum gain tilt. And the characteristic information table 80, inputting the monitored quantity of the output light power detected by the optical detector 110, outputs a value of the pumping light power in response to the monitored quantity.

The control processor 90 compares between the pumping light power value read out of the characteristic information table 80 and the monitored quantity provided by the optical detector 60, and produces a drive signal which makes the output of the pumping laser diode 40 equal to the pumping light power value outputted by the characteristic information table 80.

The rare-earth-added fiber 20 used for the optical amplifying medium was EDF. The pumping laser diode 40 used was a semiconductor laser diode having an oscillation wavelength of 0.98 μm band or 1.48 μm band in which the EDF has a large absorption coefficient.

The arrangement of FIG. 3 adopts forward pumping in which the WDM coupler 30 is connected to the input of the EDF 20.

Figure 4A:
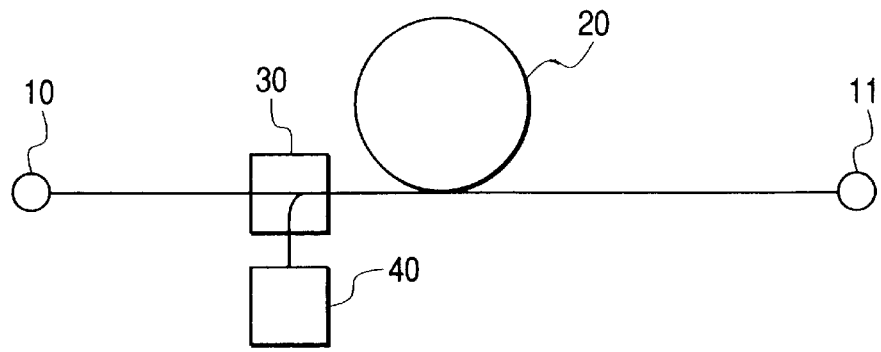
FIGS. 4(a), 4(b) and 4(c) are diagrams used to explain the pumping schemes of optical amplifier.
Figure 4B:
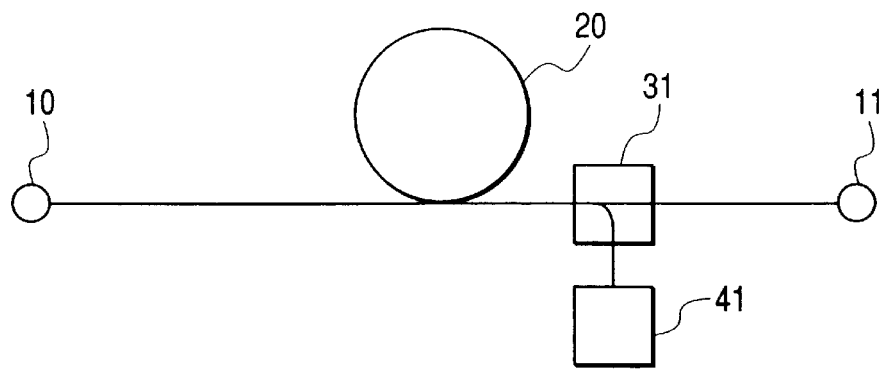
Figure 4C:
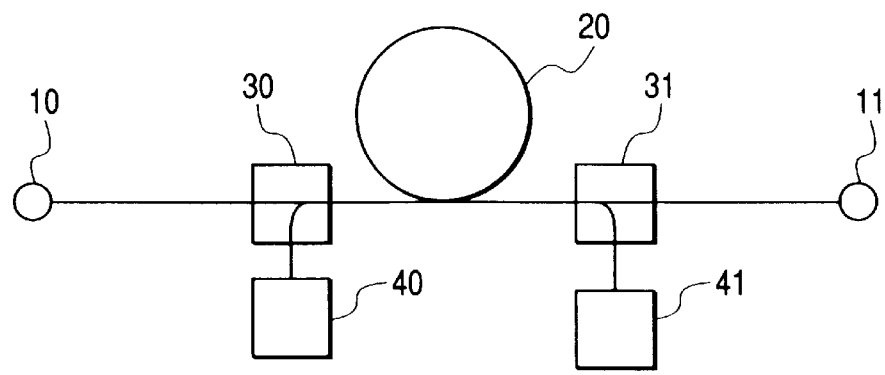

FIGS. 4(a)–(c) show three pumping schemes, of which FIG. 4(a) is forward pumping, FIG. 4(b) is backward pumping, with a WDM coupler 31 in connection with a pumping laser diode 41 being connected at the output of the EDF 20, and FIG. 4(c) is bidirectional pumping, with WDM couplers 30 and 31 being connected at both ends of the EDF 20. The embodiments of this invention can adopt any of these forward, backward and bidirectional pumping schemes.

Figure 5:
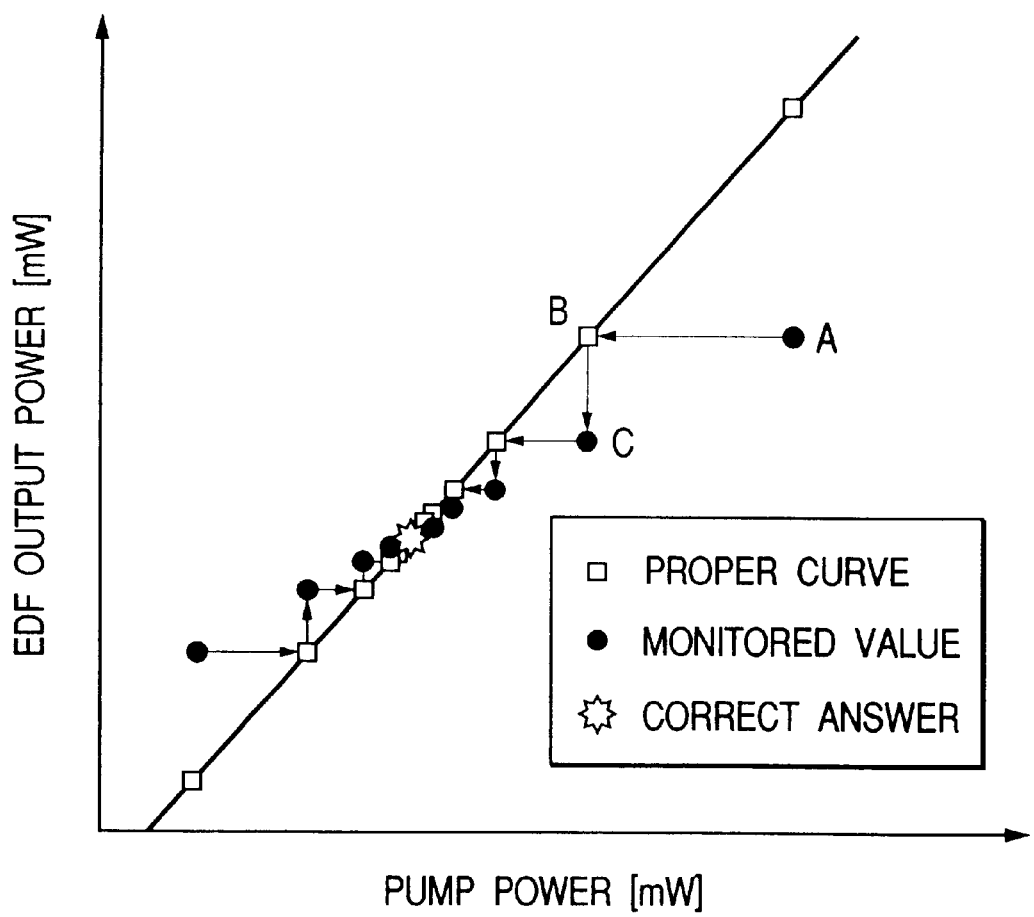
FIG. 5 is a graph used to explain the procedure of determining the pumping light power value based on a characteristic information table.

The following explains in connection with FIG. 5 the procedure of determining the pumping light power by use of the characteristic information table 80. On the graph of FIG. 5, the line which connects the plots of small square is the proper curve, whereas the plots of small filled circle are actual pumping power values and output power levels evaluated by the optical detectors 60 and 110. The plot of star on the line indicates the intended state of minimum gain tilt which is determined from the input light power and temperature (i.e., the target of control, namely the correct answer to be reached).

Initially, it is assumed that the actual value is at point A below the proper curve as shown in FIG. 5. The pumping laser diode 40 has its drive current varied so that the pumping light power shifts to point B on the curve corresponding to the output light power. However, if the pumping light power value at point B does not reached the target point (star plot), the actual value resulting from the shift of pumping power lies at point C below the curve. In this manner, the pumping light power is adjusted repetitively by being guided by the proper curve in response to the detected output light power until the control target indicated by the star plot is reached.

The criterion of the settlement of control is a certain range of the difference of the actual pumping light power value from the target pumping light power value which is calculated by using the proper curve from the actual values of the pumping light power and the output light power. Other criterion can be a certain range of the difference of the actual pumping light power value from the pumping light power value evaluated from the actual output light power by using the proper curve, i.e., the comparison result provided by the control processor 90. Still other criterion can be a certain range of the calculated distance from a plot of filled circle to the proper curve. After the settlement of control based on the criterion, the output signal light which has been amplified at the minimum gain tilt is emitted from the output port 11.

In FIG. 5, the pumping light power is increased or decreased to reach a point on the proper curve, with the EDF output power being left unchanged, (shown by the horizontal arrows), and for the determination of such incremental or decremental values, it is necessary to known in advance the relation between the drive current and the pumping light power. However, it is possible for the inventive control method to adopt an arbitrary scheme of determining the incremental or decremental value of the pumping light power. For example, the amount of variation of the drive current of the pumping laser diode is determined by multiplying a proper proportional factor to the difference between the measured pumping light power value and the pumping light power value on the proper curve read out of the characteristic information table. In this case, the proportional factor to be selected is desirably as large as possible and does not cause a severe hunting of control, i.e., the control action does not cause the actual pumping power level to cross the proper curve in large steps.

This scheme of determination of the amount of variation of the pumping laser diode drive current in proportion to the difference between the measured actual value and the theoretical value is advantageous in accomplishing a simple control system. Specifically, it is not necessary to known the exact relation between the pumping laser diode drive current and the pumping light power, and therefore a simple control algorithm can be used. A large difference between the measured and theoretical EDF output power values at a quick change of the temperature or input power level creates a large variation of drive current so that the pumping power vigorously comes close to the theoretical point on the proper curve, whereas a small difference of these power values after the measured value has come close to the theoretical value on the proper curve creates a small variation of drive current, whereby the control system enters without hunting and retains the state of settlement stably.

Figure 6:
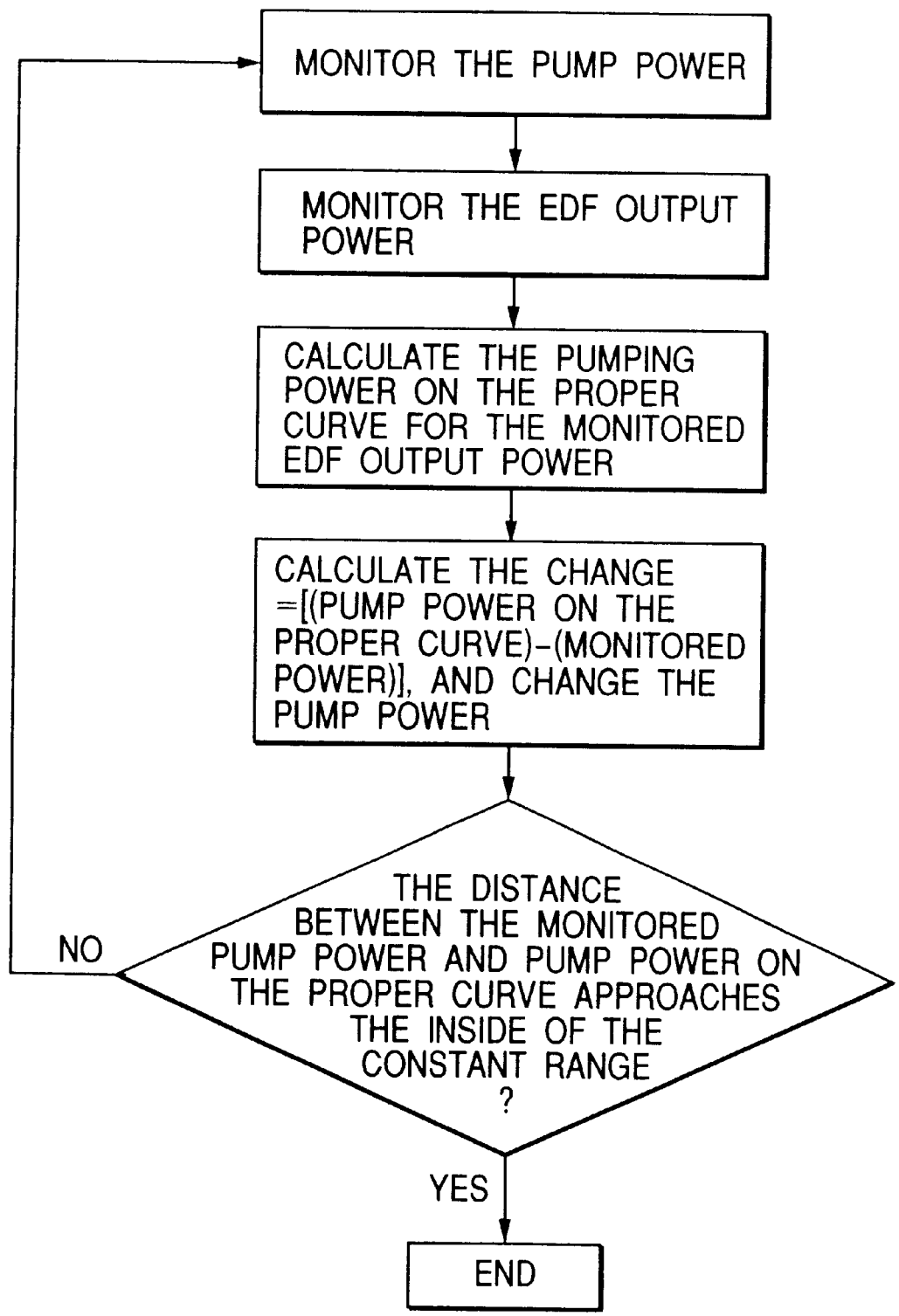
FIG. 6 is a flowchart for explaining the procedure of FIG. 5 more specifically.

FIG. 6 shows by flowchart the foregoing control operation. Initially, the optical detector 60 measures the pumping power of the light emitted by the pumping laser diode 40. Subsequently, the optical detector 110 measures the output light power of the optical amplifying medium 20. The measured output light power is put on the proper curve thereby to evaluate the pumping light power on the curve. The difference between the measured pumping light power and calculated pumping light power is calculated, and the pumping light power is varied in proportion to the difference. If the difference between the measured and calculated pumping light power is within a certain range, the control operation is terminated. Otherwise, the control operation is repeated by measuring the pumping light power.

Although in the repetitive control operation shown in FIG. 5 and FIG. 6, the pumping light power is shifted from point C to the point on the proper curve after the output light power has come to the point C, the output light power can possibly vary during the fall of the pumping light power from point A, with varying pumping light power being read out of the characteristic information table accordingly, depending on the operation of the optical amplifier, and in this case the operating point will move continuously making a curve from the point A to the target point. The pumping light controller which behaves as mentioned above can be adopted obviously by the inventive optical amplifier.

Namely, the pumping light controller of this embodiment is solely intended to include a characteristic information table which contains the output light power vs. pumping light power relation at a constant gain tilt among the wavelengths of input light and a light source controller which controls the light source based on the read-out pumping light power which is read out of the table in response to the output light power amplified by the optical amplifying medium so that the light source produces a pumping light power of the read-out power level.

In the foregoing embodiment which performs the amplification in a state of minimum gain tilt, i.e., minimum gain's wavelength dependency, the pumping light controller 70 can be configured as a digital circuit including a semiconductor IC memory and CPU (Central Processing Unit). In consequence, the optical amplifier can be made smaller in power consumption and number of component parts and simpler in structure as compared with the conventional optical amplifiers which use Peltier devices and thermistors. In case the proper curve can be formulated as a simple function such as a linear function, it is possible to configure the pumping light controller 70 with an analog circuit thereby to speed up the control operation.

Figure 7:
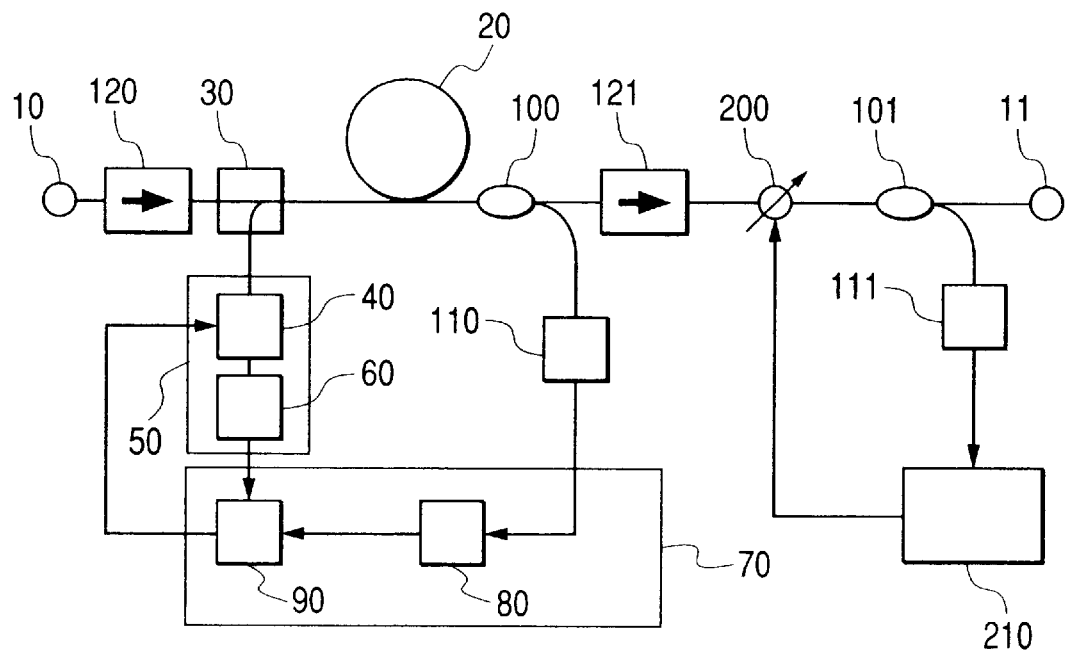
FIG. 7 is a block diagram of the optical amplifier based on a second embodiment of this invention.

Next, FIG. 7 shows the second embodiment of this invention, which is derived from the foregoing first embodiment and further provided at the optical amplifier output with a optical attenuator which is controlled in degree of attenuation in response to the output light power level (will be called a variable optical attenuator). In the figure, reference numeral 200 denotes the variable optical attenuator, 101 is a tap coupler which takes out part of the output light of the variable optical attenuator 200 while transmitting the majority thereof to the output port 11, 111 is an optical detector 210 which measures the part of the output light provided by the tap coupler 101, and 210 is an attenuation controller which controls the degree of attenuation of the variable optical attenuator 200 in response to the measurement result of the optical detector 111.

The optical amplifier of the second embodiment further includes an optical isolator 120 disposed between the input port 10 and the coupler 30, and another optical isolator 121 disposed between the tap coupler 101 and the variable optical attenuator 200. These optical isolators 120 and 121 are intended to prevent reflected lights from optical parts from entering to the transmission path or EDF 20 thereby to prevent the deterioration of transmission characteristics or amplification characteristics.

The optical detector 111 which inputs the part of the output light of the tap coupler 101 outputs a current which corresponds to the part of the output light and indicates the monitored quantity of the output light power, to the output port 11. The attenuation controller 210 controls the degree of attenuation of the variable optical attenuator 200 in response to the monitored quantity so that the output light to the output port 11 has the specified power.

Consequently, even if the power level of the input light to the input port 10 fluctuates, causing the power level of the output light of the EDF 20 fed to the variable optical attenuator 200 to vary, the output light to the output port 11 is kept at the specified constant power level.

The optical amplifier based on this embodiment performs the amplification in a state of the minimum gain's wavelength dependency and produces an output light of the specified constant power level even if the input light fluctuates in its power level.

Figure 8:
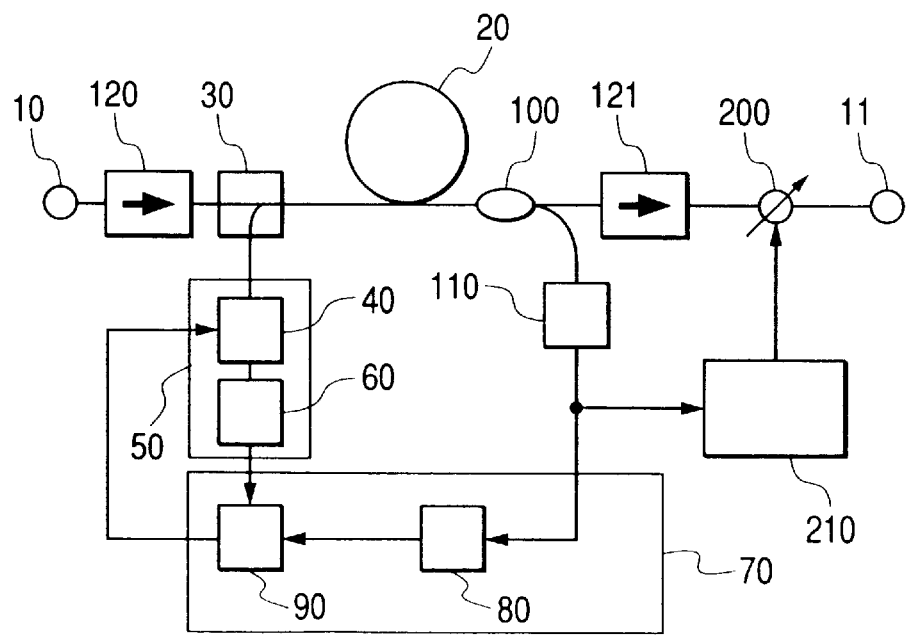
FIG. 8 is a block diagram of the optical amplifier based on a third embodiment of this invention.

FIG. 8 shows the third embodiment of this invention, which is designed to control the degree of attenuation in accordance with the detection result of the output light power of the optical amplifying medium 20. The arrangement of this embodiment is derived from the preceding embodiment of FIG. 7, where the tap coupler 101 and optical detector 111 are removed. The attenuation controller 210, which receives the monitored quantity from the optical detector 110, controls the degree of attenuation of the variable optical attenuator 200 so that the output light power to the output port 11 becomes the specified constant level. Accordingly, the variable optical attenuator 200 operates in accordance with a degree of attenuation which is proportional to its input light power, thereby implementing constant output control as the whole optical amplifier.

Next, an optical amplifier having a high output based on pumping light control which minimizes the gain tilt based on the foregoing embodiments will be explained. The high-output optical amplifier is made up of a number of optical amplifying units connected tandem, each of which is the optical amplifier shown in FIG. 1. Each optical amplifying unit undergoes the inventive pumping light control. The high-output optical amplifier employs a variable optical attenuator based on attenuation control for making the output light power level constant.

At least one variable optical attenuator is needed for a number of optical amplifying units to achieve a constant output light power level. The variable optical attenuator is located preferably at a more upstream position than the last-stage optical amplifying unit among the multi-stage amplifying sections from the viewpoint of the pumping efficiency. If, otherwise, the variable optical attenuator is disposed at the output of the last-stage amplifying unit, this optical amplifying unit needs to have a large output light power thereby to allow for attenuation control by the variable optical attenuator, i.e., the optical amplifying medium needs to have a larger pumping power.

Disposing the variable optical attenuator at a more upstream position than the last-stage amplifying unit allows the optical amplifying unit located immediately before it to have a smaller output light power owing to the amplification by the latter-stage amplifying unit. Consequently, the optical amplifying medium of the optical amplifying unit located immediately before the variable optical attenuator is not required to have a large pumping power. Based on this disposition of the variable optical attenuator, it becomes possible to avoid having a large pumping light power which is eventually wasted at the last-stage amplifying unit.

In the case of amplifying an input light of a very small power, it is desirable from the viewpoint of noise figure of the optical amplifier to avoid the disposition of a device having an optical loss between the input port and the optical amplifying unit.

Accordingly, for the accomplishment of a high-output and low-noise figure optical amplifier, it is desirable to dispose at least one optical amplifying unit each before and after the variable optical attenuator.

Figure 9:
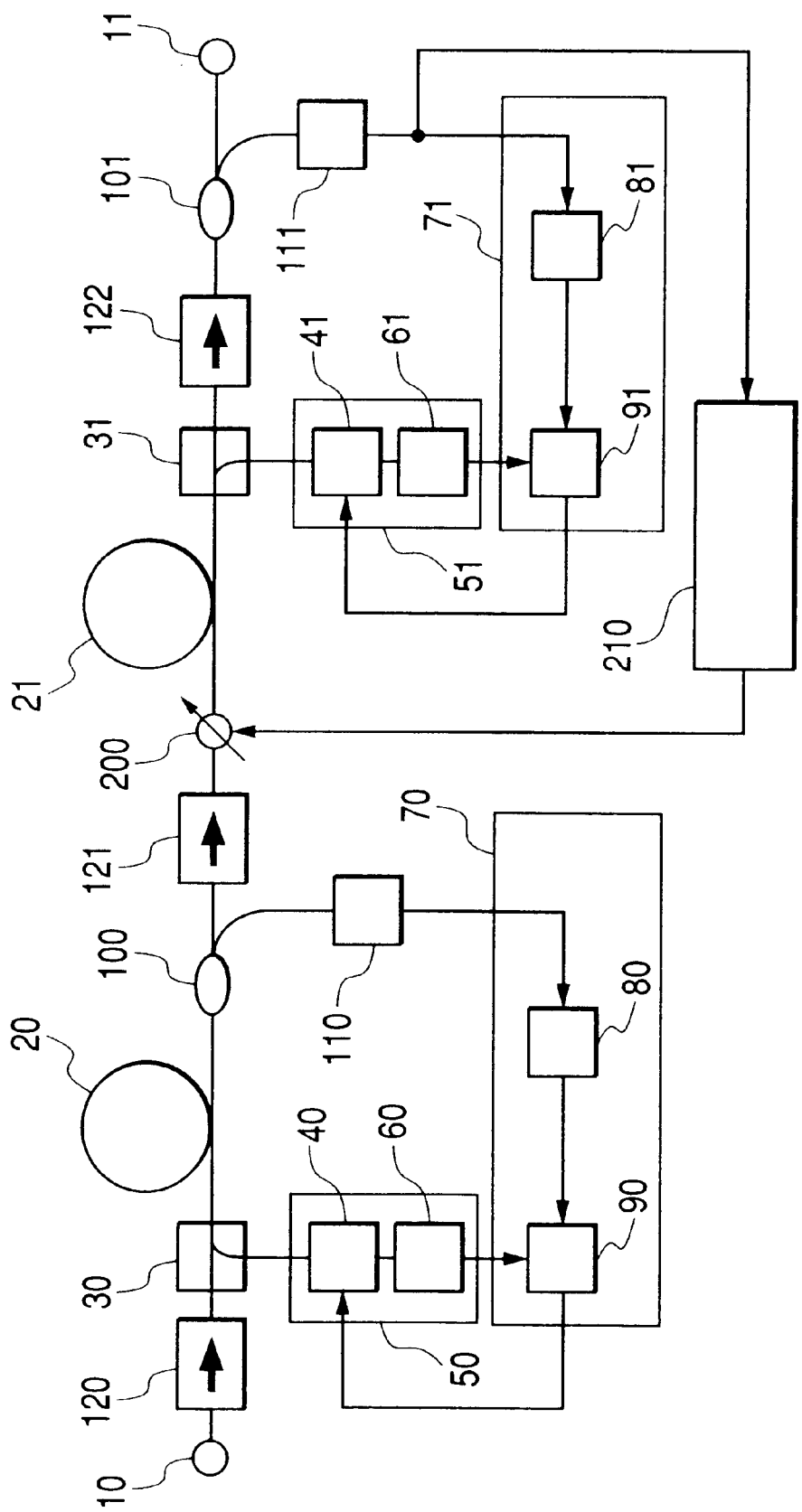
FIG. 9 is a block diagram of the optical amplifier based on a fourth embodiment of this invention.

FIG. 9 shows the fourth embodiment of this invention which is designed to have the high-output and low-noise figure performance. The optical amplifier of this embodiment includes optical amplifying units of two stages, with the variable optical attenuator 200 being disposed between them. The input port 10 is connected to the optical isolator 120 in front of the first optical amplifying unit which is the optical amplifier of the first embodiment. The signal light amplified by the first optical amplifying unit is fed to the variable optical attenuator 200 through the optical isolator 121.

The variable optical attenuator 200 has its output terminal connected to the second optical amplifying unit which is the optical amplifier of the first embodiment. The second optical amplifying unit, which is based on backward pumping, is made up of a rare-earth-added fiber 21 which receives the output light of the variable optical attenuator 200, a WDM coupler 31 which supplies a pumping light to the fiber 21, a pumping unit 51 including a pumping laser diode 41 which is the light source for generating the pumping light and an optical detector 61 for detecting the pumping light power, an optical isolator 122 which receives the output light of the WDM coupler 31, a tap coupler 101 which takes out part of the output light of the optical isolator 122 while transmitting the majority thereof to the output port 11, an optical detector 111 which receives the part of the output light from the tap coupler 101 to measure the output light power of the rare-earth-added fiber 21, and a pumping light controller 71 which controls the light power of the pumping laser diode 41 in accordance with the detection results provided by the optical detectors 61 and 111. The pumping light controller 71 includes a characteristic information table 81 and a light source controller 91 which produces a drive signal to be fed to the pumping laser diode 41. The signal light amplified by this optical amplifier is sent out through the output port 11 to the transmission path.

The attenuation controller 210, which controls the degree of attenuation of the variable optical attenuator 200, is supplied with the monitored quantity of the optical detector 111 of the second optical amplifying unit. The attenuation controller 210 controls the degree of attenuation of the variable optical attenuator 200 so that the output light power at the output port 11 is constant.

In some case depending on the optical transmission system, the WDM signal light to be sent out to the transmission path is stated in terms of its output power per channel. In this case, the light output power to the transmission path is estimated in terms of the number of channels m and power per channel Po to be mPo.

In case the optical amplifier used for such optical transmission system is designed to have information on the number of channels of the WDM signal, i.e. the number of individual signal lights, it is possible for the optical amplifier shown in FIG. 9 to omit the supply of monitored quantity from the optical detector 111 to the pumping light controller 71 and eliminate the wiring for it.

Figure 10:
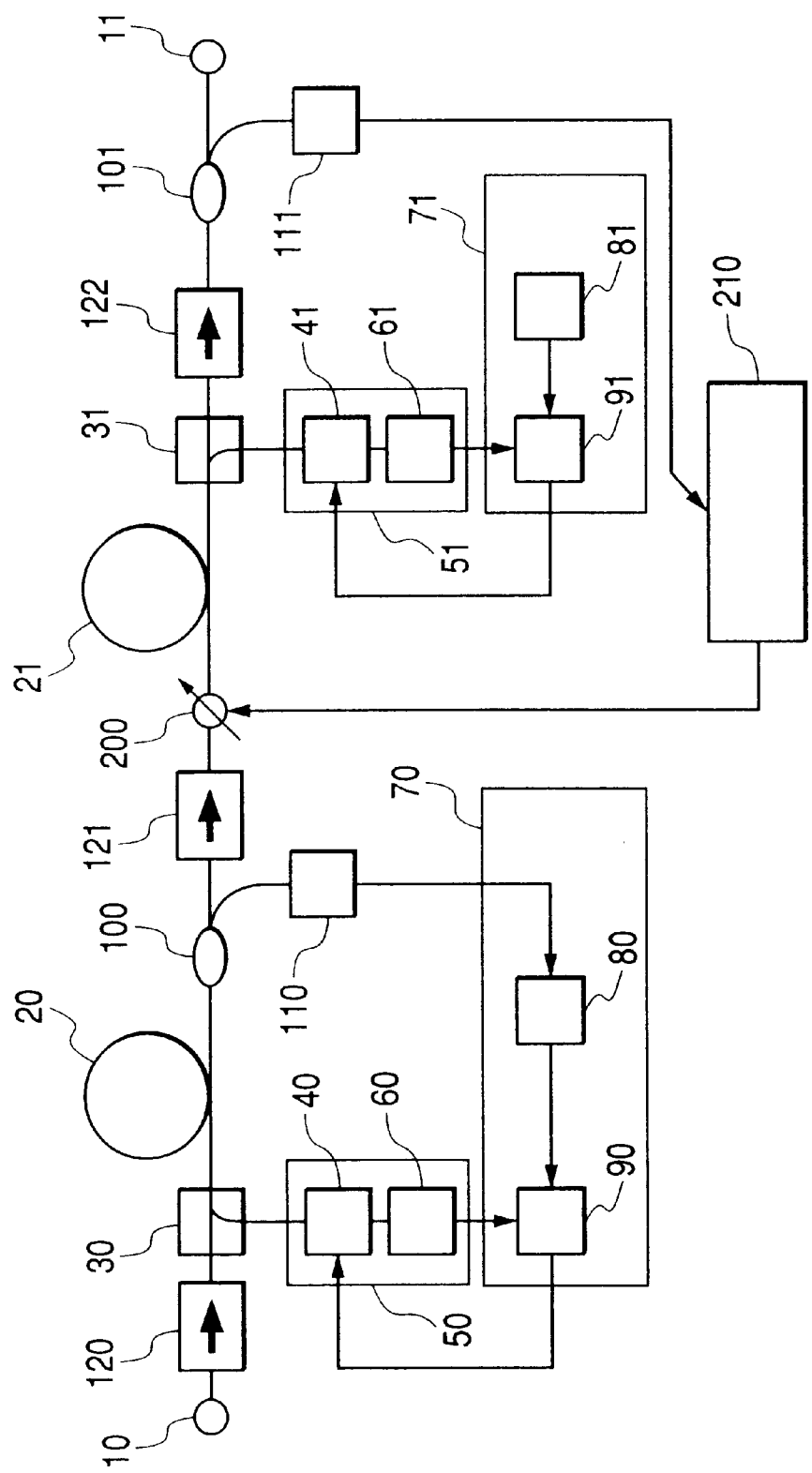
FIG. 10 is a block diagram of the optical amplifier based on a fifth embodiment of this invention.

FIG. 10 shows the fifth embodiment of this invention, which is based on this alteration of arrangement. Data of the number of individual signal lights is stored in the characteristic information table 81 of the pumping light controller 71 of the second optical amplifying unit. In the preceding embodiments, the pumping light controller 71 determines the pumping power level based on the monitored output light power, whereas in this embodiment, since the output light power can be determined as a matter of course from the data of the number of individual signal lights, the pumping light controller 71 is able to determine the pumping light power value from the data of the number of individual signal lights.

Specifically, the pumping light controller 71 has a calculating unit (not shown) for calculating the intended output light power value based on the data of the number of individual signal lights and supplies the calculated value to the characteristic information table 81, the characteristic information table 81 then releases a pumping light power value corresponding to the calculated value of the output light power. The light source controller 91 compares between the pumping light power level read out of the characteristic information table 81 and the monitored quantity provided by the optical detector 61, and produces a drive signal so that the pumping laser diode 41 generates a pumping light of the power level released by the characteristic information table 81.

In this manner, a state of minimum and constant gain tilt is achieved, and subsequently the attenuation controller 210 which receives the monitored quantity of the optical detector 111 controls the variable optical attenuator 200 so that the optical amplifier produces an output light of a intended constant value.

The number of individual signal lights can be set directly to the optical amplifier by the maintenance staff, or alternatively it can be counted automatically with a channel counter unit provided in the optical amplifier. A simple channel counter unit can be designed to scan the input signal light of the optical amplifier along the wavelength axis while counting the number of peaks. Still other scheme of providing the number of individual signal lights is to transmit a monitoring control light which has a wavelength different from those of the signal light and carries data of the number of individual signal lights. For the implementation of this scheme, the pumping light controller 70 is equipped with an interface unit (not shown) for receiving the monitoring control light which carries data of the number of individual signal lights.

In the arrangement of FIG. 10, if the deterioration of noise figure of the system is not a matter of concern, the first optical amplifying unit can be eliminated.

Figure 11:
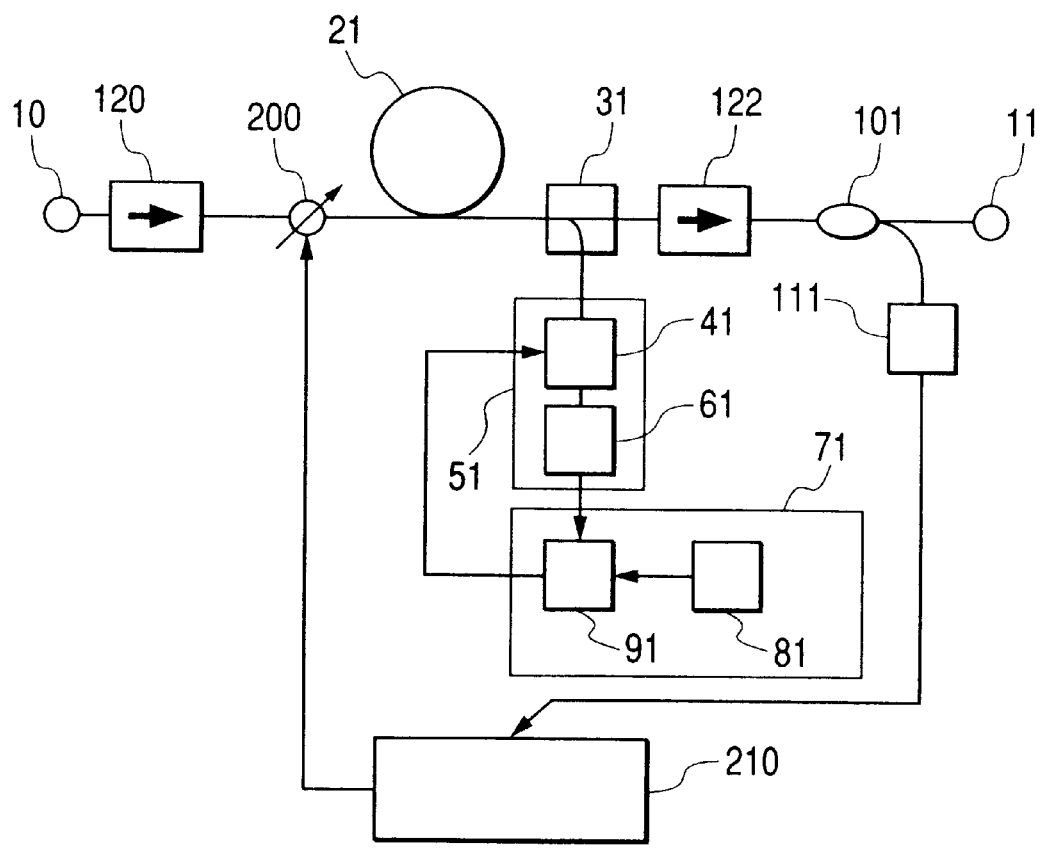
FIG. 11 is a block diagram of the optical amplifier based on a sixth embodiment of this invention.

FIG. 11 shows the sixth embodiment of this invention, which is based on a single optical amplifying unit having a former stage of the variable optical attenuator.

Figure 12:
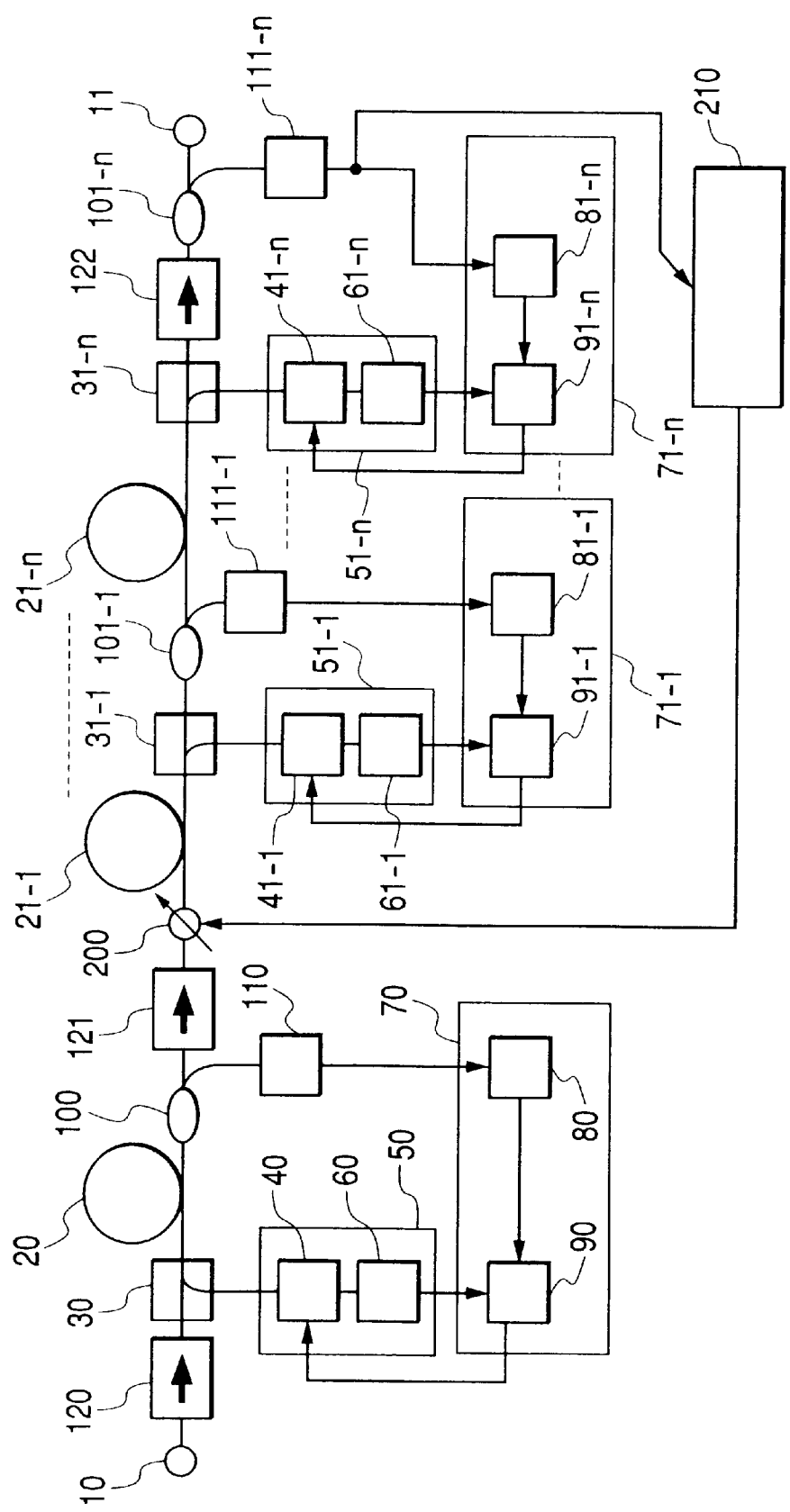
FIG. 12 is a block diagram of the optical amplifier based on a seventh embodiment of this invention.

FIG. 12 shows the seventh embodiment of this invention, which is based on optical amplifying units of three or more stages, in contrast to the foregoing embodiments which are based on one or two stages.

In this embodiment, a stage of optical amplifying unit is disposed in front of the variable optical attenuator 200, which is followed by optical amplifying units of n stages connected tandem. EDFs of n in number 21-1 through 21-n are connected with pumping sections 51-1 through 51-n by way of WDM couplers 31-1 through 31-n, and controlled by pumping light controller 71-1 through 71-n, respectively, in the same manner as the preceding embodiments thereby to attain a state of minimum gain tilt. The attenuation controller 210 controls the degree of attenuation of the variable optical attenuator 200 in accordance with the monitored quantity provided by the optical detector 111 which detects the output light power of the last-stage EDF 21-n, thereby implementing constant output control as the whole optical amplifier. This embodiment accomplishes an optical amplifier which produces a large light power.

Figure 13:
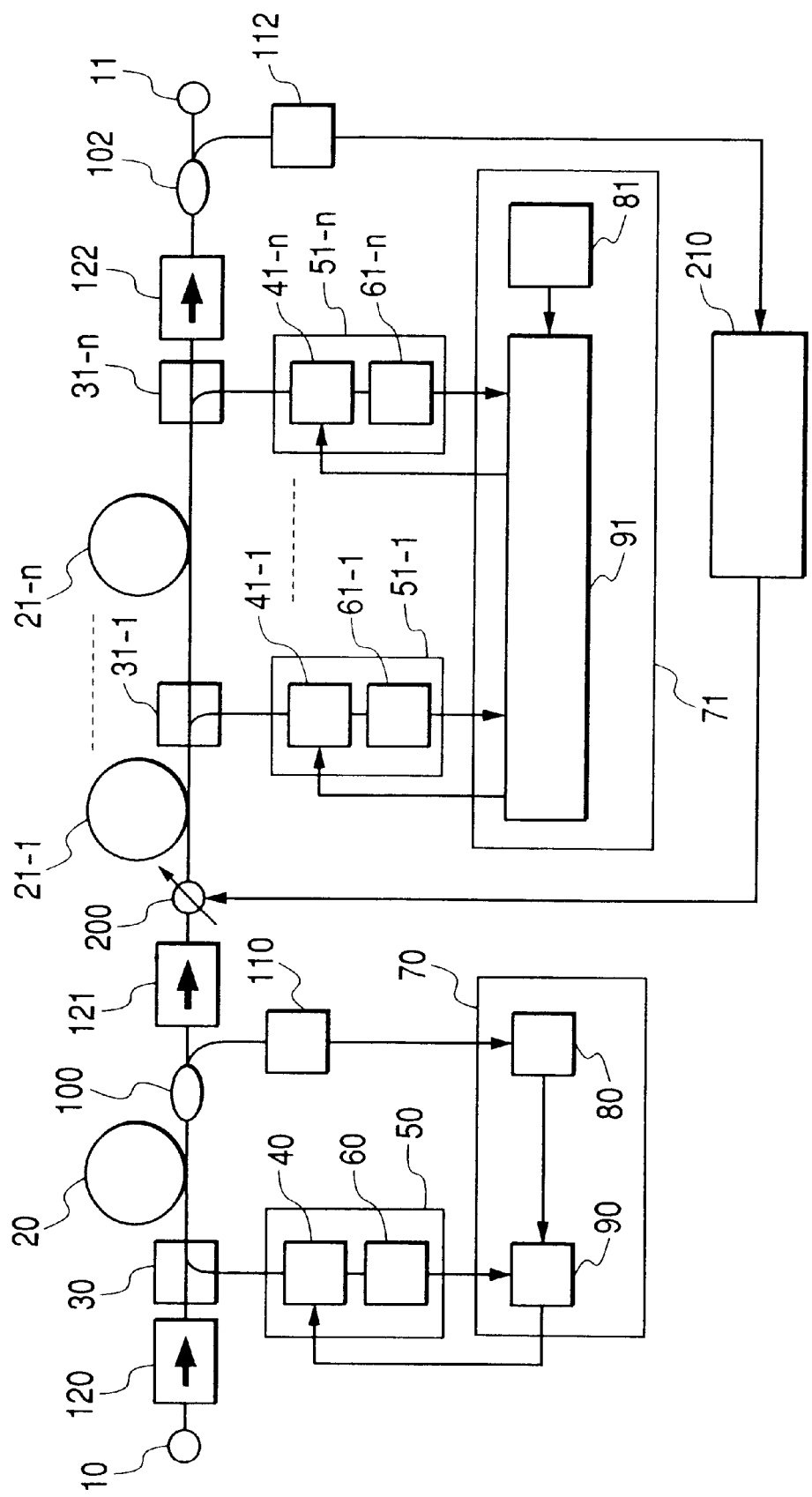
FIG. 13 is a block diagram of the optical amplifier based on an eighth embodiment of this invention.

FIG. 13 shows the eighth embodiment of this invention, which is designed to share the single characteristic information table of the pumping light controller among optical amplifying units of n stages. With constants $\alpha_1, \alpha_2, \ldots, \alpha_n$ being determined in advance, the EDFs 21-through 21-n have their pumping light power levels set to be $\alpha_1 P_p, \alpha_2 P_p, \ldots, \alpha_n P_p$. When the optical amplifying units of n stages are taken as a single optical amplifying unit, a proper curve of the relation between the output light power of the single optical amplifying unit, i.e., the n-th stage optical amplifying unit and the reference pumping power level $P_p$ at the minimum gain tilt is obtained and stored in the characteristic information table 81 in advance. The pumping light controller 91 operates on its calculating unit (not shown) to calculate the intended output light power value from the data of the number of individual signal lights, and supplies the calculated value to the characteristic information table 81. The characteristic information table 81 reads out a reference pumping power level $P_p$ corresponding to the calculated value of the intended output light power. The light source controller 91 produces drive signals for the pumping laser diodes 41-1 through 41-n so that their pumping laser power levels coincide with the $\alpha_1 P_p, \alpha_2 P_p, \ldots, \alpha_n P_p$. This embodiment accomplishes an optical amplifier having a simple multi-stage structure.

It is possible for this embodiment to control the pumping light power values, with the output light power values of the pumping laser diodes 41-1 through 41-n being set equal by providing $a_1 = \alpha_2 = \ldots = \alpha_n$, thereby more simplifying the arrangement of optical amplifier.

According to the embodiments of this invention, it is possible to accomplish an optical amplifier which implements the amplification while suppressing the gain tilt of signal light of WDM transmission even in the presence of the variation of input light power and ambient temperature. In consequence, the optical amplifier does not need to have component parts for temperature stabilization and temperature measurement and does not need to have controllers for the parts, whereby a simple and inexpensive WDM optical amplifier which is smaller in power consumption and superior in amplification characteristics can be accomplished. By using the inventive optical amplifier, it is possible to construct a simple and inexpensive optical communication system which is superior in transmission characteristics.

What is claimed is:

1. An optical amplifier comprising:

an optical amplifying medium which inputs a pumping light and a signal light simultaneously and amplifies the signal light, a light source which generates the pumping light, and a pumping light controller which controls power of the pumping light;

wherein said pumping light controller provides in advance information on a relation between power of an output light of said optical amplifying medium and power of the pumping light on condition that a gain tilt arising through said optical amplifying medium among individual signals of different wavelengths which form the signal light based on wavelength division multiplex is virtually constant or virtually minimum, takes out a value of the power of the pumping light from the relation in response to a value of the power of the output light resulting from amplification by said optical amplifying medium, and controls said light source so that the generated pumping light has the taken out value of the power of the pumping light.

2. An optical amplifier according to claim 1 further comprising:

optical attenuation means which is disposed to input the output light of said optical amplifying medium and is constructed to attenuate with variable degree of attenuation the output light of said optical amplifying medium and output the attenuated light of it, and attenuation control means which controls a degree of the attenuation so that an output light of said optical attenuation means has a predetermined power value.

3. An optical amplifier according to claim 1 comprising two optical amplifying units each including said optical amplifying medium, said light source and said pumping light controller, wherein said two optical amplifying units are connected in series becoming a former-stage and latter-stage optical amplifying units by being interposed by optical attenuation means, which attenuates with variable degree of attenuation an output light of said former-stage optical amplifying unit so that an output light of said latter-stage optical amplifying unit has a predetermined power value.

4. An optical amplifier according to claim 1 comprising optical amplifying units of n+1 in number (where n is a natural number) each including said optical amplifying medium, said light source and said pumping light controller, wherein one of said optical amplifying units becomes a former part, the others n of said optical amplifying units which are connected in series become a latter part, and said former part and said latter part are connected in series by being interposed by light attenuation means with variable degree of attenuation, which is controlled the attenuation so that an output light of the last optical amplifying unit of said latter part has a predetermined power value.

5. An optical amplifier according to claim 1, wherein the relation is expressed by or approximated by a linear function.

6. An optical amplifier according to claim 1, wherein said optical amplifying medium is formed of erbium-doped optical fiber.

7. An optical amplifier according to claim 1, wherein said light source is controlled based on the number of wavelengths of the signal light so that the output light of said optical amplifying medium has a predetermined power value.

8. An optical amplifier according to claim 7 further comprising means of calculating the number of wavelengths automatically.

9. An optical amplifier comprising:
a first optical amplifying unit which includes a first optical amplifying medium which inputs a first pumping light and a first signal light simultaneously and amplifies the first signal light by using energy of the first pumping light, a first light source which generates the first pumping light, and a first pumping light controller which controls power of the first pumping light;
wherein said first pumping light controller provides in advance information on a first relation between power of an first output light of said first optical amplifying medium and power of the first pumping light on condition that a gain tilt arising through said first optical amplifying medium among individual signals of different wavelengths which form the first signal light based on wavelength division multiplex is virtually constant or virtually minimum, takes out a value of the power of the first pumping light from the first relation in response to a value of the power of the first output light resulting from amplification by said optical amplifying medium, and controls said first light source so that the generated first pumping light has the taken out value of the power of the first pumping light;
a second optical amplifying unit which includes a second optical amplifying medium which inputs a second pumping light and a second signal light simultaneously and amplifies the second signal light by using energy of the second pumping light, a second light source which generates the second pumping light, and a second pumping light controller which controls power of the second pumping light;
wherein said second pumping light controller provides in advance information on a second relation between power of an second output light of said second optical amplifying medium and power of the second pumping light on condition that a gain tilt arising through said second optical amplifying medium among individual signals of different wavelengths which form the second signal light based on wavelength division multiplex is virtually constant or virtually minimum, takes out a value of the power of the second pumping light from the second relation in response to a predetermined value of the power of the second output light, and controls said second light source so that the generated second pumping light has the taken out value of the power of the second pumping light; and
optical attenuation means with variable degree of attenuation which is disposed between said first and second optical amplifying units.

10. An optical amplifier according to claim 9, wherein said light attenuation means is controlled such that an output light of said second optical amplifying unit has a predetermined power value.

11. An optical amplifier according to claim 9, wherein said first and second optical amplifying mediums are formed of erbium-doped optical fiber.

12. An optical amplifier according to claim 9, wherein the predetermined power value is given on the basis of the number of wavelengths of the second signal light.

13. An optical amplifier according to claim 12 further comprising means of calculating the number of wavelengths automatically.

14. An optical amplifier comprising:
a first optical amplifying unit which includes a first optical amplifying medium which inputs a first pumping light and a first signal light simultaneously and amplifies the first signal light, a first light source which generates the first pumping light, and a first pumping light controller which controls power of the first pumping light;
wherein said first pumping light controller provides in advance information on a first relation between power of an first output light of said first optical amplifying medium and power of the first pumping light on condition that a gain tilt arising through said first optical amplifying medium among individual signals of different wavelengths which form the first signal light based on wavelength division multiplex is virtually constant or virtually minimum, takes out a value of the power of the first pumping light from the first relation in response to a value of the power of the first output light resulting from amplification by said optical amplifying medium, and controls said first light source so that the generated first pumping light has the taken-out value of the power of the first pumping light;
a second optical amplifying unit which includes optical amplifying mediums of n in number (where n is a natural number) connected tandem which input a second input light and pumping lights simultaneously and amplify the second input light, light sources of n in number which generate the pumping lights to supply them to said n optical amplifying mediums respectively, and a second pumping light controller which controls the pumping lights supplied to said n optical amplifying mediums to have power values which are expressed in terms of predetermined constants $\alpha_1, \alpha_2, \ldots, \alpha_n$ and a reference pumping power $P_p$ to be a $\alpha_1 P_p, \alpha_2 P_p, \ldots, \alpha_n P_p$ in the order of alignment;
wherein said pumping light controller provides in advance with information on second relation between power of second output light of the last-stage optical amplifying medium of said optical amplifying unit and the reference pumping power $P_p$ on condition that a gain tilt arising through said n optical amplifying mediums among individual signals of different wavelengths which form the second signal light based on wavelength division multiplex is virtually constant or virtually minimum, takes out a power of the reference pumping power $P_p$ from the second relation in response to a predetermined value of the power of the second output light, and controls said n light sources so that the generated n pumping lights have the taken-out value of the reference pumping power $P_p$ multiplied by the predetermined constants respectively; and
optical attenuation means having a variable degree of attenuation which is disposed between said first and second optical amplifying units.

15. An optical amplifier according to claim 14, wherein said light attenuation means is controlled so that an output light of said second optical amplifying unit has a predetermined power value.

16. An optical amplifier according to claim 14, wherein said first optical amplifying medium and said n optical amplifying mediums are formed of erbium-doped optical fiber.

17. An optical amplifier according to claim 14, wherein the predetermined power value is given on the basis of the number of wavelengths of the second signal light.

18. An optical amplifier according to claim 17 further comprising means of calculating the number of wavelengths automatically.

* * * * *